Patented June 11, 1946

2,401,919

UNITED STATES PATENT OFFICE 2,401,919

CASEIN COMPOUND

Clarence D. Ender, Kalamazoo, Mich., assignor to Hercules Powder Company, Wilmington, Del., a corporation of Delaware No Drawing. Application April 17, 1942, Serial No. 439,391

4 Claims. (Cl. 260—119)

This invention relates to the production of casein and more particularly to the production of a metal casein complex from skim milk which is highly resistant to water.

The use of casein in such industrial application as paper coating, glues, and water paints is subject to the disadvantage that the casein has had undesirable properties of high moisture sensitivity and poor resistance to water. Such casein compositions are furthermore subject to putrefaction and degradation by hydrolysis and bacterial action, especially when the casein is being used as an aqueous alkaline solution. One method commonly employed in the art to impart to the casein product an improved resistance to water is the addition of quantities of lime to the casein solution. Another method common in the art to impart resistance to water is the inclusion of small quantities of aldehydes, particularly formaldehyde, in the casein solution. These methods have the disadvantage of an undesirably short working life of the solution, the care necessary in incorporating the agent, and the production of a viscous unworkable mass upon standing.

Now, in accordance with the present invention, skim milk is treated with an organic or inorganic soluble salt of a polyvalent metal such as zinc, cadmium, magnesium, barium, calcium, lead, nickel, copper, chromium, and iron. The addition of these salts may be accomplished by a heating from about 20° C. to about 80° C. until the casein is precipitated. The pH of the skim milk is generally about 6.6 and the pH at which the casein is precipitated falls generally between 4.9 and 5.8 but in any case is substantially higher than the isoelectric point of 4.6. The precipitated casein is then dissolved in aqueous ammonia or amine to produce solutions from which substantially water-insoluble dried casein can be prepared. The following are examples of methods of carrying out the invention:

Example I

Eighteen hundred grams of fresh skim milk were heated with stirring to a temperature of about 49 to 51° C. A 1.0 N solution of zinc sulfate was slowly added until a voluminous curd was formed. This required about 29.0 cc. of the zinc sulfate solution and reduced the pH to 5.4. The curd was separated from the whey, washed, and dried at 40 to 45° C. 15 grams of a ground portion of this dried curd were steeped in 135.0 g. of water at about 40° C. and 5.73 g. of 28% aqueous ammonia were added with stirring. The metal-casein product dissolved to form a viscous, homogeneous solution. A portion of this solution was partially dried on a metal surface and then was completely dried under vacuum at about 45° C. The resultant dried film was pulverized and 1.00 g. of the pulverized material was placed in a 25 cc. of water and allowed to stand for 24 hours with occasional agitation. The undissolved material was then separated from the water by filtration and dried under vacuum at about 45° C. The dried residue weighed 0.84 g., indicating 84% of the dried film to be insoluble in water. Under these same conditions, isoelectric casein produced by acid precipitation is completely soluble.

Example II

Eighteen hundred grams of fresh skim milk were heated with stirring to a temperature of 49 to 52° C. A 0.2 N solution of cadmium nitrate was slowly added until voluminous curd was formed. 150 cc. of the salt solution were thus consumed and the pH was reduced to 5.7. The curd was separated from the whey, washed, and dried at 40 to 45° C. The dried material analyzed 1.5 to 2.5% cadmium. 15.0 g. of a ground portion of this dried curd were steeped in 135.0 g. of water at about 40° C. and 4.48 g. of 28% aqueous ammonia were added with stirring. The metal-casein product dissolved to form a viscous, homogeneous solution and a portion of this solution was partially dried on a plated metal surface before being completely dried under vacuum at about 45° C. The resultant dried film was pulverized and 1.00 g. of the pulverized material was placed in 25 cc. of water and allowed to stand for 24 hours with osccasional agitation. The undissolved material was then separated from the water by filtration and dried under vacuum at about 45° C. The dried residue weighed 0.91 g., indicating 91% of the dried film to be insoluble in water.

Example III

Twelve hundred grams of fresh skim milk were heated with stirring to a temperature of 48 to 52° C. A .25 N solution of barium chloride was slowly added until a total of 440 cc. of the salt solution was thus added. The pH was reduced to 5.7 but no curd formed under these conditions. The temperature was slowly raised and a curd began to form at 55° C. This curd became more voluminous as the temperature was increased until precipitation was substantially complete at about 61° C. The product was separated from the whey, pressed, and dried at 40 to 50° C. The dried material analyzed 1.9 to 3.1% barium. 12.0 g. of a ground portion of this dried curd were steeped in 88 g. of water at about 40° C. and 8 cc. of 28% aqueous ammonia were added with stirring. The metal-casein product dissolved to form a viscous, homogeneous solution. A portion of this solution was partially dried on a plated metal surface and then was completely dried under vacuum at about 45° C. The resultant dried film was pulverized and 1.00 g. of the pulverized material was placed in 25 cc. of water and allowed to stand for 24 hours with occasional agitation. The undissolved material was then separated from the water by filtration and dried under vacuum at about 45° C. The dried residue weighed 0.86 g., indicating 86% of the dried film to be insoluble in water.

*Example IV*

Eighteen hundred grams of fresh skim milk were heated with stirring to a temperature of 48 to 50° C. A 1.0 N solution of nickel chloride was slowly added until a voluminous curd was formed. 70.0 cc. of the salt solution were thus consumed and the pH was reduced to 5.4. The curd was separated from the whey, washed, and dried at 40 to 45° C. The dried material analyzed 1.9 to 3.1% nickel. 15.0 g. of a ground portion of this dried curd were steeped in 135 g. of water at about 40° C. and 6.72 g. of 28% aqueous ammonia were added with stirring. The metal-casein product dissolved to form a viscous, homogeneous solution. A portion of this solution was partially dried on a plated metal surface and then was completely dried under vacuum at about 45° C. The resultant dried film was pulverized and 1.00 g. of the pulverized material was placed in 25 cc. of water and allowed to stand for 24 hours with occasional agitation. The undissolved material was then separated from the water by filtration and dried under vacuum at about 45° C. The dried residue weighed 0.95 g., indicating 95% of the dried film to be insoluble in water.

*Example V*

Twelve hundred grams of fresh skim milk were heated with stirring to a temperature of 49 to 51° C. at which the pH was determined to be 6.4. A .25 N solution of ferrous sulfate was slowly added until a voluminous curd was formed. 330 cc. of the salt solution were thus consumed and the pH reduced to 5.4. The curd was separated from the whey, washed, and dried at 40 to 45° C. The dried material analyzed 1.4 to 3.2% iron. 12.0 g. of a ground portion of this dried curd were steeped in 88 g. of water at about 40° C. and 6 cc. of 28% aqueous ammonia were added with stirring. The metal-casein product dissolved to form a viscous homogeneous solution. A portion of this solution was partially dried on a plated metal surface and then was completely dried under vacuum at about 45° C. The resultant dried film was pulverized and 1.00 g. of the pulverized material was placed in 25 cc. of water and allowed to stand for 24 hours with occasional agitation. The undissolved material was then separated from the water by filtration and dried under vacuum at about 45° C. The dried residue weighed 0.66 g., indicating 66% of the dried film to be insoluble in water.

The precipitations have been carried out with skim milk at a temperature range of approximately room temperature (20° C.) to about 80° C. In the case of the salts of the alkaline earth metals, it has been found that there are minimum temperatures below which the curd does not form when the salt is added to the skim milk. For these salts, the minimum temperature is about 50° C.

The metal salts may be added to the skim milk either in a solid state, preferably finely ground, or in a prepared water solution. The use of agitation during the precipitation is desirable to give a uniform precipitation with a given amount of salt. While the amount of the metal salts added to the skim milk in order to bring about precipitation will vary depending upon the particular metal used, it has not been found necessary in any case to use more than 1% by weight of the salt based on the weight of the skim milk. For instance, in the case of chromium sulfate, about 2.63 grams or 0.0067 mole of the salt per 1,000 grams of skim milk was necessary to effect precipitation, whereas, 5.04 grams or 0.0389 mole of nickel chloride were necessary to effect precipitation in the same quantity of skim milk.

The pH's at which the curd was formed in the skim milk also varied with the particular salt used but in most cases was within the range of 4.9 to 5.8.

While salts such as the nitrates, sulfates, acetates, and chlorides of such metals as zinc, cadmium, magnesium, barium, calcium, lead, nickel, copper, chromium, and iron have been particularly desirable, any of the polyvalent water-soluble metal salts which will precipitate casein above its isoelectric point will be useful. Of all of these salts, those of the heavy metals were found to be preferable.

The theory of the present invention appears to lie in the fact that the polyvalent metal salts of casein are less emulsoid in character than the protein materials present in skim milk and hence will precipitate at pH's substantially higher than the isoelectric pH of casein itself. The precipitation at these elevated pH conditions permits the isolation of the metal complex of casein, i. e. its combination with cations. At the isoelectric point of casein (about pH 4.6) the protein is in combination with neither cations nor anions and below the isoelectric point it is in combination with only anions. For these reasons the compositions of the present invention are prepared in a range of pH substantially higher than the isoelectric pH of casein and under those conditions at which the cation complex of the casein will no longer remain in suspension but will coagulate to form a curd.

While the precipitation has been described as being carried out in skim milk, it is possible that the invention may operate for other sources of casein such as whole milk or dried skim milk.

Alkalies other than ammonia or amines could also be used to dissolve the metal-casein product but, unless the alkali can be removed during the drying, the water solubility of the dried film is impaired.

It is also possible to improve the products of these precipitations by maintaining the high pH's during the addition of the metal salts by the addition of very small quantities of alkalies or buffer materials.

The products of this invention are useful in those applications of casein where solutions are used for the production of a water-insoluble product. Such applications are the coating and sizing of paper and textiles and other sheeted fibrous material with casein or casein-pigment combinations. The products of this invention are also useful in the production of water paints and glues.

Thus, in accordance with the present invention, a casein product, capable of producing water insoluble films from its alkaline solutions with ammonia or amines, may be precipitated directly from skim milk without the use of any alkali or acid.

What I claim and desire to protect by Letters Patent is:

1. A method of preparing a composition capable of being dried to form a water-insoluble film comprising precipitating a casein metal complex from skim milk by the addition to skim milk of less than 1% based on the weight of said skim milk of a water-soluble bivalent metal salt, thereby reducing the pH of the skim milk to between about 4.9 and about 5.8 and adjusting the temperature of the thus treated skim milk between the temperatures of about 20° C. and about 80° C. until the metal casein complex precipitates, and thereafter dissolving the precipitated casein complex in an aqueous solution of a compound selected from the group consisting of ammonia and water-soluble amines.

2. A method of preparing a composition capable of being dried to form a water-insoluble film comprising precipitating a casein metal complex from skim milk by the addition to skim milk of less than 1% based on the weight of said skim milk of zinc sulfate thereby reducing the pH of the skim milk to between about 4.9 and about 5.8 and adjusting the temperature of the thus treated skim milk between the temperatures of about 20° C. and about 80° C. until the metal casein complex precipitates, and thereafter dissolving the precipitated casein complex in an aqueous solution of a compound selected from the group consisting of ammonia and water-soluble amines.

3. A method of preparing a composition capable of being dried to form a water-insoluble film comprising precipitating a casein metal complex from skim milk by the addition to skim milk of less than 1% based on the weight of said skim milk of cadmium nitrate thereby reducing the pH of the skim milk to between about 4.9 and about 5.8 and adjusting the temperature of the thus treated skim milk between the temperatures of about 20° C. and about 80° C. until the metal casein complex precipitates, and thereafter dissolving the precipitated casein complex in an aqueous solution of a compound selected from the group consisting of ammonia and water-soluble amines.

4. A method of preparing a composition capable of being dried to form a water-insoluble film comprising precipitating a metal casein complex from skim milk by the addition to skim milk of less than 1% based on the weight of said skim milk of a water-soluble salt of an alkaline earth metal thereby reducing the pH of the skim milk to between about 4.9 and about 5.8 and adjusting the temperature of the thus treated skim milk between the temperatures of about 20° C. and about 80° C. until the metal casein complex precipitates, and thereafter dissolving the precipitated casein complex in an aqueous solution of a compound selected from the group consisting of ammonia and water-soluble amines.

CLARENCE D. ENDER.